Patented July 25, 1950

2,516,625

UNITED STATES PATENT OFFICE 2,516,625

DERIVATIVES OF DIHYDROPYRIDINE

Vernon E. Haury, El Cerrito, Calif., assignor to Shell Development Company, San Francisco, Calif., a corporation of Delaware No Drawing. Application December 2, 1946, Serial No. 713,468

21 Claims. (Cl. 260—290)

This invention relates to certain derivatives of dihydropyridine and to a process for their preparation. More particularly, the present invention relates to compounds in the dihydropyridine series of compounds and containing at least four hydrocarbon substituent groups attached to carbon atoms only of the dihydropyridine ring, and to a process whereby such substituted dihydropyridine compounds advantageously may be prepared by catalyzed reaction of monoketones with ammonia.

The derivatives of dihydropyridine provided by the present invention are of value for a variety of useful purposes. Many of them are useful as biologically active materials, or as intermediates for the preparation of biologically active materials such as antibiotics, alkaloids, pharmaceutical agents, dietary additives, and the like. In other instances, the compounds provided by the present invention are of value for use in the compounding of rubber, either synthetic or natural, or for the preparation of derived materials specifically useful in the compounding of rubber. The present dihydropyridine derivatives also are useful either in themselves or as intermediates for the preparation of plasticizers for cellulosic and/or resinous compositions, etc. Other useful applications of the dihydropyridine compounds provided by the present invention are referred to hereinafter.

Certain pyridine compounds and dihydropyridine compounds have been isolated from coal tar and the like. However, synthetic methods available for the preparation of alkyl-substituted pyridine or alkyl-substituted dihydropyridine compounds heretofore have been limited in practical applicability to the preparation of compounds containing less than four alkyl substituent groups attached to the pyridine or dihydropyridine ring. The well known nonreactivity of the pyridine ring renders the introduction of alkyl groups therein difficult, and other possible methods of synthesis have not been of practical utility except, possibly, for use in small scale or laboratory operations. The process of the present invention overcomes such difficulties heretofore encountered in that it provides a method that is economically feasible and readily adaptable to production of dihydropyridine derivatives from raw materials that are readily available at low cost.

It is known that ketones such as acetone and the like may be caused to react with ammonia to form nitrogenous products of reaction. For example, the reaction of acetone and ammonia has been shown to lead under certain conditions to the known compounds diacetoneamine, triacetoneamine, and triacetonediamine according to the following apparent equations:

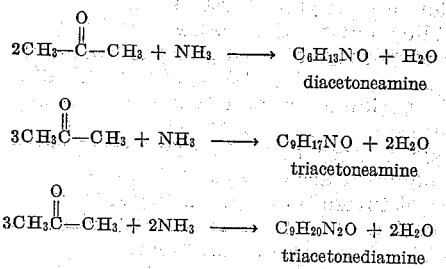

$$2CH_3-\overset{O}{\underset{\|}{C}}-CH_3 + NH_3 \longrightarrow C_6H_{13}NO + H_2O$$
diacetoneamine $$3CH_3\overset{O}{\underset{\|}{C}}-CH_3 + NH_3 \longrightarrow C_9H_{17}NO + 2H_2O$$
triacetoneamine $$3CH_3\overset{O}{\underset{\|}{C}}-CH_3 + 2NH_3 \longrightarrow C_9H_{20}N_2O + 2H_2O$$
triacetonediamine The compound known as "dehydrotriacetoneamine" also has been prepared by means of reaction between acetone and ammonia. However, reactions such as the foregoing have been effected by causing the ketone and the ammonia or other nitrogenous compounds to react in the absence of any added catalytic material, or, at the most, in the presence of only small amounts of added materials, such as salts of metals, that may have catalytic effects.

In accordance with the present invention, it has been found that the monoketones may be caused to react in the presence of substantial quantities of a strongly alkaline catalytic material to form valuable products including compounds that differ in essential respects from products heretofore obtained. For example, it has been discovered in accordance with the present invention that by reacting a ketone such as acetone with ammonia at a suitably elevated temperature and in the presence of a substantial quantity of a caustic alkali such as sodium hydroxide, there is obtained in excellent yield the highly alkylated derivative of dihydropyridine 2,2,4,6-tetramethyldihydropyridine. It has been further discovered that homologous and analogous saturated or unsaturated ketones may be employed similarly for effecting the preparation of more highly or differently substituted derivatives of dihydropyridine. By the present invention there is provided a process of wide applicability for the preparation of numerous valuable derivatives of dihydropyridine.

The ketones which may be employed in accordance with the present invention are those ketones which have directly linked to the carbon atom of the carbonyl group at least one carbon atom having two or more hydrogen atoms attached thereto. In other words, the ketones applicable in the process of the present invention are those which contain the structural grouping:

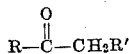

wherein R represents a hydrocarbon group and R' represents either hydrogen or a hydrocarbon group. The ketones may be either symmetrical or unsymmetrical, and the hydrocarbon groups may be either saturated or unsaturated and either aliphatic, alicyclic, or aromatic. The specific results that are obtained by means of the present process depend to a certain extent upon the particular type of ketone or ketones that are reacted with ammonia as herein described, and the selection of the particular ketone to be employed therefore will be determined in part by the result desired. By suitable selection of the ketonic reactant it is possible to obtain a wide variety of highly substituted dihydropyridine derivatives. When there is employed a ketone having two methyl groups directly linked to the carbon atom of the carbonyl group, i. e. acetone, there is produced as the principal product of reaction an unsymmetrical tetramethyl dihydropyridine having the methyl groups attached to the dihydropyridine ring in the 2,2,4 and 6 positions, respectively. More highly substituted dihydropyridines are obtained by the use of ketones containing four or more carbon atoms. For example, the reaction of methyl ethyl ketone with ammonia in accordance with the process of the present invention has been found to result in the formation of a mixture of poly-alkyl dihydropyridines comprising unsymmetrical tetra-alkyl dihydropyridines and unsymmetrical penta-alkyl dihydropyridines. Higher saturated ketones corresponding to the foregoing general formula may be employed accordingly to produce homologous highly substituted dihydropyridines.

Representative saturated aliphatic monoketones which may be employed in the process of the present invention include, for example, acetone, 2-butanone (methyl ethyl ketone), 3-pentanone (diethyl ketone), 2-pentanone, 2-methyl-3-butanone, 2,2-dimethyl-3-butanone, 2-hexanone, 3-hexanone, 3-methyl-2-pentanone, 4-methyl-2-pentanone, 2-methyl-3-pentanone, 2-heptanone, 3-heptanone, 4-heptanone, 2-methyl-4-hexanone, 2,2-dimethyl-3-pentanone, 2-octanone, 2,2,3-trimethyl-4-pentanone, 2,2,6,6-tetramethyl-4-heptanone, and homologous and analogous straight chain and branched chain monoketones having two hydrogen atoms attached to at least one carbon atom that is immediately adjacent to the carbonyl carbon atom. In place of the open chain saturated ketones, there may be employed cycloaliphatic ketones corresponding to the above formula wherein either one or both of R and R' represents a cycloalkyl group such as the cyclopentyl, cyclohexyl, and analogous and homologous radicals comprising a cycloaliphatic structure, specific examples thereof being methyl cyclohexyl ketone, ethyl cyclopentyl ketone, 3-cyclohexyl-2-butanone, 3-cyclohexyl-2-propanone, and the like.

The process of the present invention is of value in its application to the preparation of dihydropyridine derivatives having attached to carbon atoms of the dihydropyridine ring four or more hydrocarbon groups including hydrocarbyl groups of unsaturated character, i. e. hydrocarbon groups containing one or more non-aromatic, unsaturated bonds that preferably are olefinic in character. Representative examples of such unsaturated hydrocarbon groups are, for instance, vinyl, allyl, crotyl, 1-butenyl, 2-butenyl, 3-butenyl, isopropenyl, isobutenyl, 2-propynyl, 2-butynyl, 3-butynyl, and homologous and analogous unsaturated groups. Representative ketones containing such groups or similar groups and which thus may be employed in the process of the invention, include, for example, 1-buten-3-one (methyl vinyl ketone), 1-penten-4-one, 2-penten-4-one, 1-penten-3-one, 1-hexen-4-one, 1,6-heptadien-4-one, 1,4-hexadien-6-one, 1-butyn-3-one, and the like. In a preferred class of olefinically unsaturated ketones, the ketone contains only one olefinic bond, and the olefinic bond is located in the alpha,beta position relative to the carbonyl group.

There also advantageously may be employed in accordance with the present invention ketones in which either or both R or R' in the foregoing formula signifies a group of aromatic character, such as an aryl, aralkyl, or alkaryl radical. Reaction of such ketones, e. g. acetophenone, propionophenone, 1-phenyl-3-butanone, 1,5-diphenyl-3-hexanone, etc., with ammonia in accordance with the process of the invention advantageously provides novel highly substituted dihydropyridine compounds having four or more substituent groups attached to the dihydropyran nucleus, at least one of said groups being aromatic in character.

It will be appreciated that the hydrocarbon groups R and R' may be either unsubstituted or substituted, provided the substituent group is of a kind and in such a position in the molecule not to interfere with the effective practice of the process of the invention. It also will be appreciated that in place of the ketones referred to, compounds or mixtures of compounds which are convertible at least in part to a ketone of the present class under the conditions of the process also may be employed effectively.

The process of the present invention is of particular value in its application to the preparation of substituted dihydropyridine compounds from monoketones containing not more than ten carbon atoms, and particularly those monoketones which contain a methyl group directly attached to the carbon atom of the carbonyl group.

The process of the present invention is executed by reacting either a single ketone of the above class or a mixture of ketones comprising one or more ketones of the above class with ammonia at an elevated temperature and in the presence of a suitable amount of a strongly alkaline catalyst. Suitable strongly alkaline catalysts are, for example, the alkali metal alkalies, such as sodium hydroxide, potassium hydroxide, sodium carbonate, potassium carbonate, lithium hydroxide, lithium carbonate, and the like, and the alkaline earth metal hydroxides, such as calcium hydroxide, etc. Preferably there is employed as the catalyst a caustic alkali, i. e. sodium hydroxide, potassium hydroxide or lithium hydroxide. The catalyst desirably is employed as a solution in a suitable solvent, water generally being highly satisfactory. In place of water, inert organic solvents capable of dissolving the alkaline catalyst to the desired degree may be employed; for instance, methyl alcohol, ethyl alcohol, and the like. The use of an organic solvent medium frequently is advantageous in the event substantially water-insoluble ketones are to be employed as the ketonic reactant because of the resultant desirable homogenizing action of the solvent upon the reaction mixture. When there is employed a solution of the alkaline catalyst, the solution desirably is a concentrated solution, i. e. one containing at least about 15 weight per cent dissolved alkali and preferably containing between about 25 weight per cent and about 40 weight per cent dissolved alkali. It is not always essential, however, that the strongly alkaline catalyst be employed in the form of a solution in a suitable solvent. Under certain circumstances, as will be discussed more fully hereinafter, the catalyst advantageously may be employed in the solid state.

Reaction between the ketone reactant and the ammonia is effected in accordance with the invention by heating the reactants together in the presence of a substantial quantity of the strongly alkaline catalyst. The amount of the strongly alkaline catalyst that is employed most effectively in any given instance depends to a certain extent upon the particular ketone reactant that is used, the temperature of reaction, the proportions of reactants, and similar considerations. The use of insufficient amounts of strongly alkaline catalyst tends to result in low yields of dihydropyridine compounds of the present class. On the other hand, excessive amounts of catalyst or excessive contact with an otherwise suitable amount of catalyst may tend to reduce the yields of dihydropyridine compounds of the present class, apparently because of influences favoring excessive side reactions, etc. The process of the present invention is effected by carrying out the reaction in the presence of an amount of strongly alkaline catalyst effective for promoting satisfactory yields of the desired dihydropyridine compounds. In the event the catalyst is employed in the form of an aqueous solution of about 15 weight per cent or higher concentration, amounts of catalyst solution from about 0.1 to about 1.0 times the volume of ketone have been used effectively. Larger or smaller proportions of catalyst solution frequently can be used effectively. Particularly advantageous results are obtained by reaction of the ketone and the ammonia in the presence of from about 0.2 to about 0.5 volume of catalyst solution per volume of ketone.

The yield of highly substituted dihydropyridine compounds also is influenced by the relative amounts of ketone and ammonia in the reaction mixture. Higher relative amounts of ammonia in general result in higher yield of the desired products based upon the amount of ketone employed. Preferably there is employed at least 1 mole of ammonia per 3 moles of ketone. The use of more than 1 mole ammonia per 3 moles of ketone, up to about as much as 2 moles of ammonia per mole of ketone, generally results in a desirable concomitant increase in yield of the dihydropyridine compounds. Even larger amounts of ammonia may be present, if desired, although it generally has been found that the use of such larger amounts offers no particular advantage, and may, in fact, be somewhat undesirable from the standpoint of economy of operation and the like. The use of less than about 1 mole of ammonia per 3 moles of ketone generally is less desirable; however, primarily because of the reduced yields of the desired reaction products, based upon the amount of ketone reactant employed. In general, amounts of ammonia corresponding to from 0.5 mole to 5 moles or more of ammonia per 3 moles of ketone may be employed effectively.

The temperature of reaction may be varied from about ordinary room temperatures up to about 200° C. Most favorable results generally are obtained at temperatures from about 70° C. to about 150° C. The pressure may be either atmospheric or above or below atmospheric pressures. Superatmospheric pressures advantageously may be employed, particularly at the more elevated reaction temperatures, to maintain the reactants in the liquid phase or to prevent ammonia from escaping from the reaction zone. The time required to effect reaction depends upon the other conditions. Generally speaking, the reaction is relatively rapid, highly satisfactory yields being obtained in most cases with reaction times up to 4 or 6 hours. Longer reaction times may be employed if desired.

In effecting the process of the present invention, the reactants and catalyst may be brought into reactive contact in any way desired and in any suitable reaction vessel. The process may be effected in either a batchwise, an intermittent or a continuous manner. In the case of batchwise operation, the catalyst, the ketone reactant, and the ammonia may be introduced into a suitable reaction vessel and heated to the desired reaction temperature for the desired time. Preferably the reaction mixture is agitated during reaction. It is well known that ammonia and ketones are reactive together in the absence of a catalyst, some of the reactions and reaction products having been referred to hereinbefore. Excessive formation of these and similar possible products of side reaction may be avoided by conducting the present process in such a manner that prolonged contact of the ketone and ammonia in the absence of the strongly alkaline catalyst is avoided. This may be accomplished, for example, by mixing either of the two reactants with the catalyst prior to addition of the second reactant, by mixing the two reactants and the catalyst together simultaneously, or by similar means. It is not always necessary, however, to take such rigorous precautions, and in many instances highly satisfactory results have been obtained by the process of the present invention even when considerable contact time between the two reactants was permitted before addition of the catalyst.

Continuous operation of the present process may be effected, for example, by passing a mixture of catalyst solution, ammonia, and ketone in suitable proportions through a reaction vessel or reaction tube maintained at the desired temperature, the rate of flow of the mixture and the size of the reactor being so correlated that sufficient reaction time is obtained. The process of the present invention also may be effected advantageously by the use of a non-circulating catalyst solution, through and into which are circulated the ketone reactant and ammonia, the reaction mixture being continuously recovered from the catalyst solution and subsequenty separated into its several components as desired. The desired amount of catalyst solution thus conveniently may be placed in a closed, heated reaction vessel provided with suitable inlets and outlets, and liquid ammonia and a stream of the ketone reactant introduced into the catalyst solution under pressure sufficient to maintain the reactants in the liquid state and at such a rate that sufficient reaction time is obtained. When an aqueous catalyst solution is employed, the organic products of the reaction may be continuously separated from the reaction mixture as a separate phase in a suitable separator and the aqueous catalyst solution returned to the reaction chamber.

The process of the present invention also may be effected advantageously in the vapor phase as by contacting gaseous ketone and gaseous ammonia with a solid catalyst mass comprising an effective amount of a suitable strongly alkaline catalyst. The catalyst mass may be either a solid caustic alkali or equivalent strongly alkaline material, in relatively pure state, or it may be a material such as soda lime, etc., comprising a strongly alkaline material such as caustic alkali. Alternatively, the catalyst mass may comprise a suitable inert support such as a porous support, impregnated with or coated by the alkaline catalyst in either the solid state or as a concentrated aqueous solution. Catalyst temperatures of from about 100° C. to about 350° C. may be used effectively in the case of such vapor phase operations, a preferable range of temperatures being from about 200° C. to about 300° C. Temperatures up to the temperature of thermal decomposition of reactants or reaction products under the existing conditions may be employed. The ketone and the ammonia thus may be mixed in the vapor phase and in the previously stated molar proportions and the mixture contacted in a suitable reactor with the catalyst maintained within the stated temperature range, at such a rate that there ensues a contact time sufficient to effect the desired reaction at the temperature of reaction. After reaction, the gaseous mixture leaving the reaction chamber may be treated in any suitable manner so as to recover the products of reaction, and any unreacted ketone and/or ammonia may, if desired, be recycled through the process.

In the process of the present invention, water is formed as one of the products of reaction. In the case of continuous or prolonged reaction, such water is liable to be accumulated in the reaction zone and to be retained by the catalysts which in certain instances are hygroscopic in nature. The catalyst may be regenerated, if desired, either continuously or periodically by heating it or otherwise treating it to drive off or to remove the accumulated water. Alternatively, the catalyst may be replaced in whole or in part by fresh catalyst when and if excessive amounts of water have been accumulated.

The reaction mixture produced by the practice of the process of the present invention generally contains the hereindescribed substituted dihydropyridines as principal products of the reaction. Varying amounts of unreacted ketone and/or products of possible side reactions also may be present in the reaction mixture. There thus may be formed, in addition to the present derivatives of dihydropyridine which contain four or more substituent groups, derivatives of dihydropyridine of a lower degree of substitution but which, nevertheless, have intrinsic value and therefore desirably may be recovered from the reaction mixture. The dihydropyridine products of the reaction may be recovered from the reaction mixture by any suitable means, such as fractional distillation, treatment with selective solvents, and the like. Fractional distillation generally is preferred. After the initial separation, the recovered dihydropyridine products of reaction may be further purified by any suitable means as will be apparent to those skilled in the art.

The derivatives of dihydropyridine produced by the process of the present invention possess structures corresponding to the general structural formula

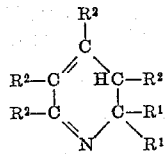

wherein the $R^1$'s and at least two of the $R^2$'s signify hydrocarbon radicals and any remaining $R^2$'s signify hydrogen. However, it has been observed that in certain cases there apparently exists a rapidly attained equilibrium between the 2,3-dihydropyridine nucleous represented in the above formula and the isomeric 1,2-dihydropyridine nucleus represented in the formula

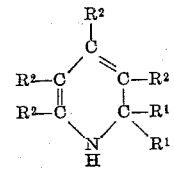

When employed in the present specification and claims, it will be appreciated that these and specific formulae or names derived therefrom are used to refer generically to any of the possible tautomeric isomers resulting from such rapid shifts in the positions of a hydrogen atom and the double bonds.

The process of the present invention may be used to prepare a wide variety of unsymmetrical dihydropyridine derivatives corresponding to the above general formula. The process thus can be employed advantageously for preparing the dihydropyridine derivative 2,2,4,6-tetramethyldihydropyridine by the reaction of acetone and ammonia in the presence of caustic alkali as herein described. Mixtures of methyl ethyl ketone and mesityl oxide may be employed for production of derivatives of dihydropyridine containing ten carbon atoms, particularly 2,2,4,5,6-pentamethyldihydropyridine, and 2,2,4-trimethyl-6-ethyldihydropyridine. The use of methyl ethyl ketone as the sole ketone reactant provides derivatives of dihydropyridine containing twelve carbon atoms and corresponding to the above generic formula, such as 2,5,6-trimethyl-2,4-diethyl-dihydropyridine and 2-methyl-2,4,6-triethyldihydropyridine and others. Homologous and analogous unsymmetrical dihydropyridines may be prepared by reaction with ammonia of suitable ketones such as methyl vinyl ketone, methyl propyl ketone and other homologous and analogous ketones hereinbefore referred to.

Further dihydropyridine derivatives of the present class which may be prepared by the process of the present invention from saturated aliphatic monoketones include, for example, 2,2,4,6 - tetraethyl - 3,5-dimethyldihydropyridine, 2,2,3,4,5,6-hexaethyldihydropyridine, and homologous substituted dihydropyridines containing a total of at least four separate alkyl substituent groups attached to at least three different carbon atoms of the dihydropyridine ring. Dihydropyridine derivatives wherein at least one of the four hydrocarbon groups contains an olefinic bond also are provided by the present invention, e. g., 2,6-divinyl-2,4-dimethyl-3-methylenedihydropyridine, 2,6-diallyl-2,4-dimethyl-3-vinyldihydropyridine, and homologs and analogs thereof. Substituted dihydropyridine compounds wherein at least one of the hydrocarbon groups of the foregoing formula represents a group of aromatic character also may be prepared by the process of the present invention, such as 2,6-dimethyl-2,4-diphenyldihydropyridine, 2,6-dibenzyl-3-phenyl-2,4-dimethyldihydropyridine, and homologous and analogous compounds. In a preferred embodiment of the invention, the substituted dihydropyridine compounds contain not more than 21 carbon atoms, and contain only open chain hydrocarbon groups attached to the dihydropyridine nucleus.

As previously indicated, the derivatives of dihydropyridine provided by the present invention have a wide field of utility. In addition to their applications previously mentioned, the compounds of the invention find utility as intermediates for the preparation of derived chemical compounds. The corresponding tetrahydropyridine and piperidine derivatives may be prepared by suitable hydrogenation procedures. Valuable resins may be produced from the present compounds, as by reaction with aqueous formaldehyde or other resinifying agents, to provide products useful as tackifiers in rubber compositions and the like.

The following examples will serve to illustrate certain specific embodiments of the present invention.

*Example I*

Eight hundred seventy parts of acetone and 510 parts of a 37.5% aqueous solution of sodium hydroxide were placed in a reaction vessel and 170 parts of anhydrous ammonia were added. The mixture was heated in 2 minutes to 120° C. and maintained at that temperature for 1.5 hours under autogenous pressure. At the end of this time, the mixture was removed from the reactor and the organic phase of the mixture was separated and fractionally distilled. There were recovered 245 parts of 2,2,4,6-tetramethyldihydropyridine distilling at 162° C. under atmospheric pressure and having a density ($d_4^{20}$) of 0.865 and a refractive index ($n_D^{20}$) of 1.473.

In this experiment, 47% of the acetone used was consumed. Of the acetone consumed, 77% was converted to the stated dihydropyridine derivative.

*Example II*

Four hundred eighty parts of a 30 per cent by weight solution of sodium hydroxide in water, 1000 parts of acetone, and 191 parts of anhydrous ammonia were introduced into a closed reaction vessel and heated rapidly to 100° C. The reaction mixture was maintained at this temperature under autogenous pressure for 4 hours and then cooled. The organic phase was separated from the reaction mixture and fractionally distilled. There were recovered 416 parts of 2,2,4,6-tetramethyldihyropyridine, corresponding to a conversion of 52.8%, and a yield of 87.7% based on the acetone consumed.

*Example III*

The experiment of Example II was repeated employing the same quantities of reactants but a reaction temperature of 160° C. and a reaction time of 0.5 hour. By fractional distillation of the organic phase of the reaction mixture, 236 parts of 2,2,4,6-tetramethyldihydropyridine were recovered, corresponding to a 29.8 per cent conversion of the acetone employed to the tetramethyldihydropyridine, and a yield of 67.0 per cent based on the acetone consumed.

*Example IV*

A steam heated closed reaction vessel provided with a mechanical stirrer and with inlet and outlet means was filled under pressure with 213 cubic centimeters of a 33 weight per cent solution of sodium hydroxide in water, and sufficient anhydrous ammonia and acetone in equimolar quantities to fill the vessel. The contents of the vessel were heated to 120° C., the pressure being maintained by means of a pressure regulating valve at about 390 pounds per square inch (gauge). Anhydrous ammonia and acetone then were introduced in equimolar quantities continuously and under pressure into the reaction vessel, with agitation of the contents of the vessel, at such a rate that a contact time of 2.4 hours was obtained. The reaction mixture was continuously passed to a separator from which the aqueous sodium hydroxide was returned continuously to the reaction vessel and the organic phase withdrawn through a pressure regulating valve for fractional distillation. The process was continued until a steady state of reaction had been obtained and a sample of the product then was collected and fractionally distilled. 46 per cent of the acetone employed after attainment of the steady state was found to have been converted to tetramethyldihydropyridine, with a yield of 82.3% based on acetone consumed.

*Example V*

Four hundred parts of a 25 weight per cent solution of sodium hydroxide in water, 392 parts mesityl oxide, 576 parts of methyl ethyl ketone and 187 parts anhydrous ammonia were heated together for 2 hours at a temperature of 100° C. and under a pressure of 200 to 250 pounds per square inch (gauge). The organic phase of the reaction mixture was separated and fractionally distilled. 72 parts of unsymmetrical tetramethyldihydropyridine and 68 parts of a mixture of 2,2,4,5,6-pentamethyldihydropyridine and 2,2,4-trimethyl-6-ethyldihydropyridine were recovered.

*Example VI*

An equimolar mixture of methyl vinyl ketone and acetone was heated with ammonia in the presence of an aqueous solution of caustic alkali. Alkyl substitution products of dihydropyridine were recovered from the reaction mixture in good yields.

*Example VII*

Seven hundred ninety-three parts of methyl ethyl ketone and 119 parts of anhydrous ammonia were reacted in the presence of 400 parts of a 30 weight per cent solution of sodium hydroxide in water. 19 parts of a mixture of substituted dihydropyridines containing 12 carbon atoms per molecule and distilling at 118° C. to 122° C. at 50 mm. Hg were recovered by fractional distillation of the resulting mixture.

I claim as my invention:

1. As a new chemical compound, 2,2,4,5,6-pentamethyldihydropyridine.

2. As a new chemical compound, 2,2,4-trimethyl-6-ethyldihydropyridine.

3. A continuous process for the preparation of 2,2,4,6-tetramethyldihydropyridine which comprises disposing in a reaction zone an aqueous solution of sodium hydroxide, said solution having a concentration by weight of from about 25 per cent to about 45 per cent, establishing in said zone a temperature from about 70° C. to about 150° C. and a pressure sufficient to maintain the liquid phase, introducing into said zone while maintaining said conditions of temperature and pressure ammonia and acetone in proportions corresponding to a molar proportion from about 1 mole of ammonia per 3 moles of acetone to about 2 moles of ammonia per mole of acetone, agitating the solution to afford intimate contact of the reactants with each other and with the solution, whereby said ammonia and said acetone are caused to react to form a product containing 2,2,4,6-tetramethyldihydropyridine, and continuously separating said product from the aqueous solution.

4. A process for the preparation of 2,2,4,6-tetramethyldihydropyridine which comprises bringing acetone and ammonia into reactive contact in an aqueous solution of a non-volatile caustic alkali, said solution having a weight concentration of the caustic alkali from about 25 per cent to about 45 per cent, in a molar proportion of from about 1 mole of ammonia per 3 moles of acetone to about 2 moles of ammonia per mole of acetone at a temperature from about 70° C. to about 150° C. and under a pressure sufficient to maintain the liquid phase, and separating a product comprising 2,2,4,6-tetramethyldihydropyridine from the solution.

5. A process for the preparation of 2,2,4,5,6-pentamethyldihydropyridine which comprises heating a mixture of about 392 parts by weight of mesityl oxide, about 576 parts by weight of methyl ethyl ketone, about 187 parts of ammonia and about 400 parts of a 25 per cent by weight aqueous solution of sodium hydroxide at about 100° C. under a pressure of about 200 to about 250 pounds per square inch, and separating from the solution a product containing said pentamethyldihydropyridine.

6. A process for the preparation of 2,2,4,6-tetramethyldihydropyridine which comprises mixing acetone and ammonia in an aqueous solution of an alkali metal hydroxide having a concentration by weight of at least 15 per cent at an elevated temperature up to about 200 C., maintaining the mixture at such an elevated temperature and for a time sufficient to effect the reaction, and separating from the mixture a product comprising said tetramethyldihydropyridine.

7. A process for the preparation of 2,2,4,6-tetramethyldihydropyridines which comprises passing acetone and ammonia into simultaneous contact with a catalyst mass comprising a non-volatile caustic alkali hydroxide at temperature below a temperature at which substantial thermal decomposiion of reactants and/or reaction products occurs, maintaining the reactants in contact with the catalyst mass at a reaction temperaure for a time sufficient to effect the reaction, and recovering as a product of the reaction a product comprising said dihydropyridine.

8. A process for preparation of a dihydropyridine having a formula from the group consisting of

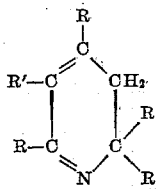

and

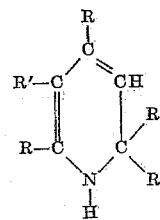

wherein each R represents an aliphatic hydrocarbon radical and R' is a member of the group consisting of hydrogen and an aliphatic hydrocarbon radical which comprises reacting a ketone wherein the carbonylic carbon atom is one of an open chain of carbon atoms with ammonia in the presence of an alkaline catalyst comprising strong non-volatile mineral alkali selected from the class consisting of hydroxides and carbonates at a reaction temperature below a temperature at which substantial decomposition of reactants and reaction products occurs, and recovering as a product of the reaction a product comprising said dihydropyridine.

9. A process as defined in claim 8 wherein the reaction temperature is from room temperature up to about 200° C.

10. A process as defined in claim 9 wherein the ketone is an aliphatic ketone of 3 to 10 carbon atoms.

11. A process as defined in claim 10 wherein the reaction is effected in the presence of a concentrated aqueous solution of a non-volatile mineral alkali.

12. A process as defined in claim 11 wherein the alkali is an alkali metal carbonate.

13. A process as defined in claim 11 wherein the alkali is an alkaline earth metal hydroxide.

14. A process as defined in claim 11 wherein the ketone is methyl ethyl ketone.

15. A dihydropyridine of at least 10 carbon atoms having a formula from the group consisting of

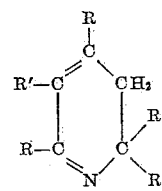

and

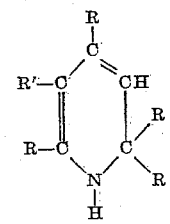

wherein each R represents an aliphatic hydrocarbon radical and R' is a member of the group consisting of hydrogen and an aliphatic hydrocarbon radical.

16. A dihydropyridine as defined in claim 15 wherein at least one of said aliphatic hydrocarbon radicals is an alkenyl group.

17. A dihydropyridine containing from 10 up to 21 carbon atoms and having a total of 5 separate aliphatic hydrocarbon groups substituted upon the dihydropyridine ring in positions Nos. 2, 2, 4, 5 and 6 thereof, respectively.

18. 2,2,4,6-tetraalkyldihydropyridine, at least one of the alkyl groups being the ethyl radical.

19. 2,2,4,5,6-pentaalkyldihydropyridine.

20. As new chemical compounds, 2,2,4,6-tetraalkyldihydropyridines containing from 10 up to 21 carbon atoms, the alkyl groups being the only substituents present on the dihydropyridine ring.

21. 2,2,4,6-tetraalkyldihydropyridine, at least one of the alkyl groups being an alkyl group which contains a plurality of carbon atoms.

VERNON E. HAURY.

REFERENCES CITED

The following references are of record in the file of this patent:

UNITED STATES PATENTS

| Number | Name | Date |
|---|---|---|
| 2,413,598 | Ballard | Dec. 31, 1946 |

OTHER REFERENCES

Hollins: "Synthesis of Nitrogen Ring Compounds," page 225, D. Van Nostrand Co. (1924).

Oparina: Berichte 64 (1931), pages 567, 578.

Ephram: "Inorganic Chemistry," 4th ed., Science Publishing Co., 1943, pp. 416 and 411.